United States Patent
Serban et al.

(10) Patent No.: US 8,940,660 B2
(45) Date of Patent: Jan. 27, 2015

(54) SIMULTANEOUS WARM GAS DESULFURIZATION AND COMPLETE CO-SHIFT FOR IMPROVED SYNGAS CLEANUP

(75) Inventors: Manuela Serban, Des Plaines, IL (US); Kurt M. Vanden Bussche, Des Plaines, IL (US); Alakananda Bhattacharyya, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 204 days.

(21) Appl. No.: 12/328,488

(22) Filed: Dec. 4, 2008

(65) Prior Publication Data

US 2010/0133473 A1 Jun. 3, 2010

(51) Int. Cl.
| | |
|---|---|
| *B01J 23/00* | (2006.01) |
| *C07C 1/02* | (2006.01) |
| *B01D 53/56* | (2006.01) |
| *C01B 3/12* | (2006.01) |
| *C01B 3/16* | (2006.01) |
| *C01B 3/56* | (2006.01) |
| *B01J 8/02* | (2006.01) |
| *B01J 8/04* | (2006.01) |
| *B01J 20/02* | (2006.01) |
| *B01J 20/08* | (2006.01) |
| *B01J 35/00* | (2006.01) |
| *C10J 3/46* | (2006.01) |
| *C10K 1/00* | (2006.01) |
| *C10K 3/04* | (2006.01) |
| *B01J 23/86* | (2006.01) |

(52) U.S. Cl.
CPC ... *C01B 3/56* (2013.01); *B01J 8/02* (2013.01); *B01J 8/04* (2013.01); *B01J 20/0225* (2013.01); *B01J 20/08* (2013.01); *B01J 35/0006* (2013.01); *C01B 3/16* (2013.01); *C10J 3/466* (2013.01); *C10K 1/004* (2013.01); *C10K 3/04* (2013.01); *B01D 2257/304* (2013.01); *B01D 2257/308* (2013.01); *B01J 23/868* (2013.01); *B01J 2208/025* (2013.01); *C01B 2203/045* (2013.01); *C01B 2203/0485* (2013.01); *C10J 2300/0959* (2013.01); *C10J 2300/1618* (2013.01); *Y02E 60/36* (2013.01); *Y02E 20/18* (2013.01)
USPC ...... 502/335; 502/337; 252/373; 423/244.06; 423/244.1; 423/437.2; 423/655; 423/656

(58) Field of Classification Search
None
See application file for complete search history.

(56) References Cited

U.S. PATENT DOCUMENTS

| | | | |
|---|---|---|---|
| 2,649,166 A | 8/1953 | Porter et al. | |
| 2,853,433 A * | 9/1958 | Keith | 208/58 |
| 2,863,527 A | 12/1958 | Herbert et al. | |
| 2,926,751 A | 3/1960 | Kohl et at. | |
| 3,362,133 A | 1/1968 | Kutsher et al. | |
| 3,505,784 A | 4/1970 | Hochgesand et al. | |
| 3,957,962 A | 5/1976 | Ramsbotham | |
| 4,536,381 A * | 8/1985 | Blytas | 423/437.2 |
| 5,045,222 A | 9/1991 | Endo et al. | |
| 5,130,288 A | 7/1992 | Delzer et al. | |
| 5,254,516 A | 10/1993 | Gupta et al. | |
| 5,281,445 A | 1/1994 | Khare | |
| 5,306,685 A | 4/1994 | Khare | |
| 5,741,469 A * | 4/1998 | Bhore et al. | 423/244.01 |
| 5,753,198 A * | 5/1998 | Ayala et al. | 423/210 |
| 6,479,429 B1 | 11/2002 | Khare | |
| 7,067,093 B2 | 6/2006 | Vierheilig et al. | |
| 8,435,912 B2 * | 5/2013 | Chaumonnot et al. | 502/158 |
| 2002/0009407 A1 * | 1/2002 | Kourtakis et al. | 423/418.2 |
| 2002/0098129 A1 * | 7/2002 | Martin et al. | 422/173 |
| 2002/0110503 A1 * | 8/2002 | Gittleman et al. | 422/190 |
| 2004/0163311 A1 * | 8/2004 | Ahmed et al. | 48/127.9 |
| 2004/0170549 A1 | 9/2004 | Vierheilig et al. | |
| 2005/0097819 A1 * | 5/2005 | Lomax et al. | 48/127.9 |
| 2005/0229489 A1 * | 10/2005 | Bavarian et al. | 48/198.7 |
| 2005/0229490 A1 * | 10/2005 | Stevens et al. | 48/198.7 |
| 2007/0012028 A1 * | 1/2007 | Weissman et al. | 60/275 |
| 2007/0031309 A1 * | 2/2007 | Jain et al. | 423/224 |
| 2007/0283812 A1 * | 12/2007 | Liu et al. | 96/150 |
| 2008/0005964 A1 * | 1/2008 | Hajiaghajani | 48/61 |
| 2010/0133147 A1 * | 6/2010 | Chaumonnot et al. | 208/144 |

FOREIGN PATENT DOCUMENTS

| | | |
|---|---|---|
| EP | 0094206 A1 | 11/1983 |
| KR | 10-2004-0015167 A | 2/2004 |
| WO | 0125140 A1 | 4/2001 |
| WO | 03015908 A1 | 2/2003 |
| WO | 2008/015323 * | 2/2008 |

OTHER PUBLICATIONS

Yadav et al., "Evolution of a Nanociystalline (Co,Ni) Al2O4 Spinel Phase from Quasicrystalline Precursor", Int. J. Appl. Ceram. Technol., vol. 5, No. 5, 2008, pp. 449-457.

* cited by examiner

*Primary Examiner* — Melvin C Mayes
*Assistant Examiner* — Sheng H Davis

(57) ABSTRACT

The present invention involves both separated beds (or physical mixture) and a process for treating a fuel gas comprising sending the fuel gas to a separated bed (or physical mixture), in which the separated beds comprise a first bed of a sulfur sorbent and a second bed of a water gas shift catalyst (a physical mixture of a sulfur sorbent and a water gas shift catalyst). The process comprises first sending the fuel gas to the first bed to remove sulfur compounds from said fuel gas and then the fuel gas goes to the second bed to undergo a water gas shift reaction in which carbon monoxide is converted to carbon dioxide and water is converted to hydrogen. (or sending the fuel gas simultaneously to the physical mixture to remove simultaneously the sulfur compounds and to react CO with water to CO2 and hydrogen).

25 Claims, No Drawings

SIMULTANEOUS WARM GAS DESULFURIZATION AND COMPLETE CO-SHIFT FOR IMPROVED SYNGAS CLEANUP

BACKGROUND OF THE INVENTION

This invention relates to the materials used for and process for both the removal of sulfur compounds from a gaseous stream and for the water gas shift reaction. More specifically, the invention relates to the use of a sulfur absorbent and a water gas shift catalyst used as a physical mixture or in separated bed configurations to provide for simultaneous desulfurization and complete water gas shift at temperatures of about 450° C.

The gaseous stream may originate from any partial oxidation or gasification process of any carbon containing feedstock. The gaseous stream may be a fuel gas originating from an IGCC (Integrated Gasification Combined Cycle) coal gasification plant, it may be a flue gas from a fluid catalytic cracking unit (FCC), and it may be a synthesis gas (syngas) from steam reforming of natural gas, certain gasification reactions or from gasification of coal. Synthesis gas is the name generally given to a gaseous mixture principally comprising carbon monoxide and hydrogen, but also possibly containing carbon dioxide and minor amounts of methane and nitrogen. It is used, or is potentially useful, as feedstock in a variety of large-scale chemical processes, for example: the production of methanol, the production of gasoline boiling range hydrocarbons by the Fischer-Tropsch process and the production of ammonia. Processes for the production of synthesis gas are well known and generally comprise steam reforming, autothermal reforming, non-catalytic partial oxidation of light hydrocarbons or non-catalytic partial oxidation of any hydrocarbons. In such a process, molecules of hydrocarbons are broken down to produce a hydrogen-rich gas stream.

IGCC technology produces air emissions that are already considerably lower than required by current U.S. Clean Air standards. Significant reductions in sulfur dioxide ($SO_2$), nitrogen oxides ($NO_x$) and carbon monoxide (CO) are possible through use of IGCC plants, making them more advantageous in this respect than conventional coal power plants. Carbon dioxide ($CO_2$), which is considered a major source of global warming, can be captured more economically with IGCC than with conventional technologies. The $CO_2$ could be sequestered or sold in part as a by-product. Overall efficiency is approximately 40 to 45 percent of the energy value of coal converted to electricity. In comparison, conventional coal plants are approximately 30 to 35 percent efficient. Water requirements are typically about 50 percent less for IGCC applications than for conventional coal generation. Marketable by-products from the IGCC process can be sold, such as sulfur. However, IGCC facilities are more expensive to build than conventional coal plants. Only recently have suppliers begun to emerge that can offer comprehensive, integrated designs with packaged systems and compatible equipment. Due to the industry's limited experience with the technology, truly accurate cost estimates for construction and operating costs are not yet available for use in planning future facilities.

IGCC technology requires more frequent maintenance with longer maintenance outages, requiring that power be purchased from other resources when the IGCC plant is unavailable. Neither of the U.S.-based IGCC projects has used Powder River Basin, or western, coal, which is the type used most frequently in the Midwest. The industry is encouraging suppliers to offer performance contracts for next-generation IGCC plants, but for now, the risk of reduced reliability and availability add significant cost to the project's financing.

Only a few IGCC projects have been built world-wide despite the potential benefits of the technology. Among the improvements that are sought are methods of cleaning up the hot coal derived gases produced in an IGCC project. In prior art systems, wet scrubbing techniques have been used to clean up the gases. Unfortunately, these systems require first cooling of the gas and then a subsequent reheating step.

Regardless of the carbon source and gasification process, a fuel gas has to be substantially cleaned before being either burned in a gas turbine or used for chemical synthesis, e.g., methanol, ammonia, urea production, or Fischer-Tropsch synthesis. Cleanup techniques require removal of solid particulates, sulfur-containing gases, i.e., $H_2S$ and COS as well as all trace contaminants resulting from the gasification of coal. These contaminants include ammonia, hydrogen cyanide, chlorides, alkali metals, metal carbonyls, Hg, As, Se. Ideally, the clean-up of the fuel gas would be done at the highest temperature possible that the fuel gas distribution system can be designed for since this would avoid the loss of sensible heat due to the cooling and subsequent reheating associated with wet scrubbing techniques used in prior art processes. If the fuel gas is cleaned with the conventional cold gas cleanup, the penalties in both thermal and overall process efficiencies will be larger for air-blown gasifiers compared to $O_2$-blown gasifiers, because the former produces over twice the volume of fuel gas produced by the latter. But nevertheless, both air- and $O_2$-blown gasifiers would benefit from the successful development of warm or hot-gas cleanup techniques.

Hot particulate removal systems have been successfully demonstrated commercially, but the cleanup of undesired gases still needs to be developed. All large scale warm desulfurization demonstration units have failed mostly due to inappropriate sulfur-scavenger materials. The warm gas desulfurization demonstration units at the Piñon Pine Air-Blown IGCC and at the Tampa Electric Polk Power station used Zn-based S-scavenger materials. The Piñon Pine Air-Blown and Hot Gas Cleanup IGCC using a KRW air-blown pressurized fluidized-bed coal gasification system with Southern Utah bituminous coal containing 0.5-0.9% sulfur (design coal) and Eastern bituminous coal containing 2-3% sulfur (planned test). The purpose was to demonstrate air-blown, pressurized, fluidized-bed IGCC technology incorporating hot gas cleanup (HGCU); to evaluate a low-Btu gas combustion turbine; and to assess long-term reliability, availability, maintainability, and environmental performance at a scale sufficient to determine commercial potential. Steady state operation was not reached in the course of the 42 months demo operation and the Zn-based S-scavenger material failed since it did not hold up physically in the entrained bed reactor. Zn was lost during the 538° C. reaction via volatilization. The second large scale hot gas desulfurization demo unit at Tampa Electric Polk Power station intended to clean 10% of the fuel gas by a hot-gas cleanup system developed by GE Environmental Services, Inc. The hot gas desulfurization unit was an intermittently moving bed of Zn oxide based sorbent that operated at 482° C. The demonstration again failed due to very high attrition loss (which made operation with that particular sorbent far from cost effective) and due to significant reactivity loss because of Zn sulfate formation and Zn volatilization. (References: The Piñon Pine IGCC Project, U.S. DOE and Piñon Pine Power Project Reports, December 1996; January 2001 (DE-FC-21-92MC29309); The Tampa Electric IGCC Project, U.S. DOE and Tampa Electric Reports, October 1996; July 2000; August 2002 (DE-FC-21-91MC27363).

In addition, with the current state of development of hot gas cleanup systems, other contaminants besides sulfur compounds and solid particulates can not be removed at equally high temperatures. A further consideration is that due to the concern about global warming, there will be regulatory requirements to remove carbon dioxide from gasification plants. This will mean that all IGCCs will need to be equipped with at least one CO-shift reactor, requiring thus cooling the fuel gas to temperatures adequate for the water gas shift catalytic reaction. In view of these $CO_2$ regulations, the trend in the gasification industry is towards the use of direct water quench gasifiers. The quench mode design significantly reduces the capital cost of syngas cooling, while heat integration maintains good overall thermal efficiency. The quench mode is advantageous for the water gas shift reaction as the raw syngas becomes saturated with steam generated by evaporation of a portion of the quench water. An entrained-flow slurry-fed gasification with direct water quenching is the preferred and commonly used option of GE Energy, and recently, Shell, Lurgi and Siemens also offer the water quenching cooling method. In addition to efficiently cooling the raw syngas and recovering part of the sensible heat, significant decontamination takes place in the quenching step. Solid particulates, alkali metals, non-volatile metals, chlorides, the bulk of metal carbonyls and part of ammonia are all removed in the water quenching step. The contaminants left in the raw syngas after the water quenching step include about 50-100 ppmv ammonia, 1 to 4 ppmv Ni and Fe carbonyls, about 50-100 ppmv HCN, Hg, As, and sulfur-containing gases, i.e., $H_2S$ and COS. All these contaminants must be removed before the syngas is either burned in a gas turbine or used for chemical synthesis.

SUMMARY OF THE INVENTION

This invention discloses the concept of using a sulfur-absorbent and a water gas shift catalyst as a physical mixture, or arranged in a separated bed configuration arrangement to achieve at least 80% of the CO shift equilibrium conversion and simultaneously completely removing the sulfur compounds (including COS and $H_2S$) from a gaseous stream originating from the gasification of a carbon-containing feedstock in a temperature range of 250° to 550° C.

The sulfur absorbent material is a nickel aluminate catalyst, which is preferably selected from the group consisting of $Ni_{2x}Al_2O_{2x+3}$, $Ni_{(2-y)}Ni^0{}_yAl_2O_{(5-y)}$, $Ni^0{}_{(4-y)}Ni^0{}_yAl_2O_{(7-y)}$, $Ni_{(6-y)}Ni^0{}_yAl_2O_{(9-y)}$, and intermediates thereof, wherein $x \geq 0.5$ and $0.01 \leq y \leq 2$. Preferably, x is between 1 and 3. More preferably, the nickel containing compound further comprises $Ni_{2x}Al_2O_{2x+3-z}S_z$ wherein $0 \leq z \leq 2x$. The nickel containing compound reacts with more than 10% of sulfur compounds within the gaseous stream.

The water gas shift catalyst is a sulfur-tolerant catalyst with the active phase comprising an iron oxide phase.

Thus, the hydrogen production is maximized and the clean, concentrated CO2 stream can be captured using either a solvent process, e.g., UOP's Selexol process, or alternatively using high temperature $CO_2$ absorbents. This integrated desulfurization and CO-shift concept represents the next generation of synthesis gas treating.

Currently, regenerable solvent-type acid gas removal processes are used in both IGCCs and chemical synthesis applications, e.g., UOP's Selexol process (U.S. Pat. Nos. 2,649,166 and 3,362,133) or Linde Engineering's Rectisol process (U.S. Pat. No. 2,863,527). Unfortunately, these processes require cooling the fuel gas to low temperatures and then subsequently reheating it to temperatures adequate to its downstream use. This issue associated with the solvent scrubbing based clean-up processes can be addressed by using the concept disclosed in this invention. This invention relates to the use of a sulfur absorbent and a water gas shift catalyst used as a physical mixture or in separated bed configurations to provide for simultaneous desulfurization and complete water gas shift at temperatures of about 450° C.

This invention discloses the concept of using two materials in a physical mixture or in a separated bed configuration for achieving at least 80% of the CO-shift equilibrium conversion and simultaneous and complete removal of the S-compounds (COS and $H_2S$) contained in a fuel gas in the temperature range 250° to 550° C. The exhaust stream coming out of this one-stage separated bed system contains, in addition to steam, $H_2$ and $CO_2$, approximately 5 vol-% unconverted CO that could be shifted completely in a second sweet CO-shift stage. A CO conversion to $CO_2$ of 90% corresponds to a carbon capture ratio of approximately 85%. Thus, the hydrogen production is maximized and the clean, concentrated $CO_2$ stream can be captured using either a physical solvent process, e.g., Selexol, or alternatively using high temperature $CO_2$ absorbents. This integrated desulfurization and CO-shift concept represents the next generation of synthesis gas treating and extend its applicability beyond power applications to chemicals and fuels.

DETAILED DESCRIPTION OF THE INVENTION

This invention discloses the concept of using two materials in a physical mixture or in separated bed configuration for achieving at least 80% of the CO-shift equilibrium conversion and simultaneous and complete removal of the S-compounds (COS and $H_2S$) contained in a fuel gas originating from a coal gasifier in the temperature range of 250° to 550° C. The materials are fully regenerable via an oxidative regeneration step.

The sulfur absorbent material is a nickel aluminate catalyst, which is preferably selected from the group consisting of $Ni_{2x}Al_2O_{2x+3}$, $Ni_{(2-y)}Ni^0{}_yAl_2O_{(5-y)}$, $Ni_{(4-y)}Ni^0{}_yAl_2O_{(7-y)}$, $Ni_{(6-y)}Ni^0{}_yAl_2O_{(9-y)}$, and intermediates thereof, wherein $x \geq 0.5$ and $0.01 \leq y \leq 2$. Preferably, x between 1 and 3. More preferably, the nickel containing compound further comprises $Ni_{2x}Al_2O_{2x+3-z}S_z$ wherein $0.5 \leq x \leq 3$ and $0 \leq z \leq 2x$. The nickel containing compound reacts with more than 10% of sulfur compounds within the gaseous stream.

The water gas shift catalyst is a sulfur-tolerant catalyst with the active phase comprising an iron oxide phase, e.g., the commercial iron-based Haldor-Topse high temperature sulfur tolerant water gas shift catalyst SK-201-2.

The sulfur adsorbent, also referred to as sorbent, and water gas shift catalyst are present in a weight ratio of from about 5:1 to 0.5:1. Preferably the weight ratio is about 2:1.

In those embodiments, when the sulfur sorbent and the water gas shift catalyst are present as a separated bed, the separated bed comprises a first bed of a sulfur sorbent and a second bed of a water gas shift catalyst. The separated bed may be within a single vessel or in multiple vessels. The process comprises first sending a synthesis gas to the first bed to remove sulfur compounds from the synthesis gas and then the synthesis gas goes to the second bed to undergo a water gas shift reaction in which carbon monoxide is converted to carbon dioxide and water is converted to hydrogen. In another embodiment, the sulfur sorbent and the water gas shift catalyst may be present as one or more intermittently stacked separated beds of the sulfur sorbent and water gas shift catalyst.

The gaseous stream that is being purified may be at a pressure between about 10 to 80 bar.

This invention discloses the concept of using two catalysts in a physical mixture or in separated bed configuration for achieving at least 80% of the CO-shift equilibrium conversion and simultaneous and complete removal of the S-compounds (COS and $H_2S$) contained in a fuel gas originating from a coal gasifier in the temperature range of 250° to 550° C. The materials are fully regenerable via an oxidative regeneration step. The sulfur absorbent material is a nickel aluminate catalyst, which is preferably selected from the group consisting of $Ni_{2x}Al_2O_{2x+3}$, $Ni_{(2-y)}Ni^0_yAl_2O_{(5-y)}$, $Ni_{(4-y)}Ni^0_yAl_2O_{(7-y)}$, $Ni_{(6-y)}Ni^0_yAl_2O_{(9-y)}$, and intermediates thereof, wherein $x \geq 0.5$ and $0.01 \leq y \leq 2$. Preferably, x is between 1 and 3. More preferably, the nickel containing compound further comprises $Ni_{2x}Al_2O_{2x+3-z}S_z$ wherein $0 \leq z \leq 2x$. The nickel containing compound reacts with more than 10% of sulfur compounds within the gaseous stream. The water gas shift catalyst is a sulfur-tolerant catalyst with the active phase comprising an iron oxide phase, e.g., the commercial iron-based Haldor-Topse high temperature sulfur tolerant water gas shift catalyst SK-201-2. The COS present in the gaseous stream is completely hydrolyzed and hydrogenated to $H_2S$, while the $H_2S$ is completely absorbed and the CO reacts with water to form $CO_2$ and $H_2$ such that the exhaust stream coming out of this physical mixture or separated bed configuration is a S-free CO-shifted gaseous stream. At least 50% of the sulfur is removed through this process and preferably there is complete removal of the sulfur.

EXAMPLE 1

An Ni aluminate catalyst with the final formula $Ni_{4.09}Al_2O_{7.09} \cdot 2.4H_2O$ was prepared via a Layered Double Hydroxide (LDH) Metal Oxide Solid Solution (MOSS) route. In this procedure, a clear solution was prepared by combining 328.0 g of 50% aqueous NaOH with 1170.0 g DI water, followed by the addition of 136.1 g of $NaCO_3:H_2O$. A second solution was prepared by dissolving 345.3 g Ni$(NO_3)_2:6H_2O$ and 217.7 g Al$(NO_3)_3:9H_2O$ into 840.0 g DI water. The aqueous metal nitrate solution was then added to the first solution dropwise while stirring over a 2 hour period. The reaction mixture was heated to 80° C. and held at temperature for 16 to 18 hours while stirring. The solids were then isolated by vacuum filtration and washed vigorously with DI water (26 liters) and dried in ambient air. At this point, XRD confirmed the synthesis of Ni—Al—O Layered Double Hydroxide material which was then calcined (in flowing air) for 6 hours at 450° C. followed by 4 hours at 550° C. to generate the metal oxide solid solution. The resulting material contained 58.5 wt-% Ni, had a surface area of 189 $m^2/g$, pore volume=0.337 $cm^3/g$ and pore diameter=71 Å.

EXAMPLE 2

The Ni aluminate sulfur absorbent catalyst described in Example 1 was arranged in a separated bed configuration with a commercial SK-201-2 Haldor-Topse high temperature sulfur tolerant water gas shift catalyst for improved CO conversion. The commercial SK-201-2 Haldor-Topse high temperature sulfur tolerant water gas shift catalyst contains 80-90% $Fe_2O_3$, 1-2% CuO and 7-11% $Cr_2O_3$.

All experiments were done at atmospheric pressure, 450° C. with a gas simulating an oxygen blown gasifier (1.1% $H_2S$+0.0763% COS+45% $H_2$+46% CO+7.2% $CO_2$+0.7% $CH_4$); steam: CO molar ratio 3.5:1 and GHSV=1300 $h^{-1}$ GHSV=2100 $h^{-1}$ through the Ni aluminate and 3000 $h^{-1}$ through the CO-shift catalyst). The regeneration was done with 2% $O_2$ in $N_2$ at 500° C. and GHSV=1300 $h^{-1}$. The two materials were separated by a quartz wool layer.

In a multi-cycle test with such a separated bed configuration, the CO-shift conversion to $CO_2$ was >90% (95% of equilibrium conversion at 450° C.) in all cycles while the S uptake remained 10 wt-% S before S-breakthrough. The COS present in the feed was completely hydrolyzed and hydrogenated to H2S, and the H2S has been completely absorbed by the Ni aluminate sulfur-absorbent, such that no S-compounds have been detected in the exhaust stream.

The regeneration was done with 2% $O_2$ in $N_2$ at 500° C. The performance is identical in all five cycles, with the exception of the very first cycle, when approximately 10% $CH_4$ is formed which represents about 60% of the equilibrium methane formation. The samples arranged in a separated bed have been heated to the reaction temperature under a $H_2$ atmosphere, such that some of the Ni present in the Ni aluminate catalyst had been reduced to the metallic state thus creating the active sites for the methanation reaction. The high temperature iron-based SK-201-2 water gas shift catalyst does not promote the methanation reaction. Methane formation is undesirable since it contributes to the non-captured carbon inventory; however, the yield to methane in all subsequent cycles is zero.

In the first cycle, the amount of methane formed decreased continuously as the Ni metal was progressively being sulfided. Without wanting to be bound by any theory, we believe that the S-compounds present in the feed inhibit the methanation reaction since they adsorb on the same sites, i.e., $Ni^0$, as $H_2$ would otherwise adsorb reducing thus the hydrogenation activity. Sulfur poisons the ability of Ni-catalysts to hydrogenate the carbon atom much more severely than the ability to form carbon-carbon bonds. However, since the feed contains a large amount of steam, the C—C bond formation is also inhibited, such that the only reaction that takes place involving the C-containing compounds is the water gas shift reaction. The high temperature iron-based SK-201-2 water gas shift catalyst does not promote methanation. The materials were regenerated via oxidative regeneration at 500° C. under 2% $O_2$ in $N_2$. Only sulfur dioxide was detected during the oxidation step.

In the second through the fifth cycles, the S uptake before breakthrough was 10 wt-% S while the CO conversion to CO2 was 90%. No $CH_4$ was formed in the second through the fifth cycles. The methane formation is completely inhibited due to the absence of $Ni^0$ and also probably due to a S poisoning effect by the 0.5 to 1.5 wt-% residual S left behind after the regeneration step. The presence of the residual S was confirmed via the S-XRF analysis of the KOH scrubbing solution and by XAFS analysis. As indicated before, sulfur adsorbs strongly on the sites that $H_2$ would otherwise adsorb reducing thus the hydrogenation activity of the Ni based catalyst.

The high temperature water gas shift catalyst is known to be sulfur tolerant, maintaining its CO-shift activity in a syngas containing <100 ppm. Even if the fuel gas used in these experiments has >10,000 ppm S, the exposure of the water gas shift catalyst to the S-compounds is limited since the S-scavenger, i.e., the Ni aluminate catalyst is the first material in the separated bed arrangement. The repeated oxidative regeneration treatment did not negatively affect the Haldor-Topse SK-201-2 catalyst shift performance, such that the CO-shift conversion of the separated bed configuration is maintained at about 90% in all cycles. The exhaust stream coming out of this one-stage separated bed system contains, in addition to steam, $H_2$ and $CO_2$, approximately 5 vol-% unconverted CO that could be shifted completely in a second sweet CO-shift stage. A CO conversion to $CO_2$ of 90% corresponds to a carbon capture ratio of approximately 85%. The COS present in the feed was completely hydrolyzed and hydrogenated to H2S, and the H2S has been completely absorbed by the Ni aluminate sulfur-absorbent, such that no S-compounds have been detected in the exhaust stream.

The following table summarizes the performance of this Ni aluminate and Haldor-Topse SK-201-2 catalyst separated bed configuration for warm gas desulfurization and CO conversion. The yields to $CO_2$ and $CH_4$ were calculated according to:

$$Y_{CO_2} = \frac{\%CO_2^{out} - \%CO_2^{in}}{\%CO^{in}}$$

and $$Y_{CH_4} = \frac{\%CH_4^{out} - \%CH_4^{in}}{\%CO^{in} + \%CO_2^{in}}$$

where: $X_{CO}$=carbon monoxide conversion (%); $Y_{CO2}$=yield to carbon dioxide (%); $Y_{CH4}$=yield to methane (%); $\%_{(CO2, CO, CH4)}^{in}$ refers to the volume % of CO2, CO or CH4 in the feed gas and $\%_{(CO2, CO, CH4)}^{out}$ refers to the volume % of CO2, CO or CH4 in the exhaust gas.

TABLE

Performance of this Ni aluminate and SK-201-2 separated bed configuration for warm gas desulfurization and CO conversion

| Material | Cycle | Minutes on stream wt. no S | Wt-% S (up to break-through) | $X_{CO}$ (%) | $Y_{CO2}$ (%) | $Y_{CH4}$ (%) |
|---|---|---|---|---|---|---|
| Separated Bed (Ni aluminate + SK-201-2) | 1 (ramp T under H2) | >324 | >10 (stopped before breakthrough) | 95 | 83→67 | 17→4 |
| | 2-5 | 280 | 10 | 90 | 63 | 0 |

The invention claimed is:

1. A process for treating a gaseous stream, the process comprising the steps of:
introducing the gaseous stream comprising carbon monoxide, $H_2S$ and COS to a reactor vessel containing a sulfur sorbent comprising a nickel aluminate catalyst selected from the group consisting of $Ni_{2x}Al_2O_{2x+3}$, $Ni_{(2-y)}Ni^0_yAl_2O_{(5-y)}$, $Ni_{(4-y)}Ni^0_yAl_2O_{(7-y)}$, $Ni_{(6-y)}Ni^0_yAl_2O_{(9-y)}$, and intermediates thereof, wherein x>0.5 and 0.01<y<2 and a water gas shift catalyst comprising an active phase comprising an iron oxide phase; and
contacting the gaseous stream with the sulfur sorbent and the water gas shift catalyst at processing conditions effective for removal of the $H_2S$ and COS with the sulfur sorbent and effective for a water gas shift reaction over the water gas shift catalyst.

2. The process of claim 1 wherein the sulfur sorbent and water gas shift catalyst are present as a physical mixture.

3. The process of claim 2 wherein the sulfur sorbent and the water gas shift catalyst are present in a weight ratio of about 5:1 to 0.5:1.

4. The process of claim 2 wherein the sulfur sorbent and the water gas shift catalyst are present in a weight ratio of about 2:1.

5. The process of claim 1 wherein the sulfur sorbent and the water gas shift catalyst are present as separated beds within the reactor vessel.

6. The process of claim 5 wherein the separated beds comprise a first bed of the sulfur sorbent and a second bed of the water gas shift catalyst, wherein the process further comprises the steps of first sending the gaseous stream to the first bed to remove the $H_2S$ and COS from the gaseous stream and then sending the gaseous stream to the second bed to undergo the water gas shift reaction wherein the carbon monoxide is converted to carbon dioxide and water is converted to hydrogen.

7. The process of claim 5 wherein the sulfur sorbent and the water gas shift catalyst are present in a weight ratio of about 5:1 to 0.5:1.

8. The process of claim 5 wherein the sulfur sorbent and the water gas shift catalyst are present in a weight ratio of about 2:1.

9. The process of claim 5 wherein the sulfur sorbent and the water gas shift catalyst are present as one or more intermittently stacked beds of the sulfur sorbent and water gas shift catalyst.

10. The process of claim 1 wherein the water gas shift catalyst is effective under a sulfur compound containing gas stream.

11. The process of claim 10 wherein the water gas shift catalyst comprises an active phase comprising one or more metal oxides.

12. The process of claim 11 wherein the water gas shift catalyst contains iron.

13. The process of claim 1 wherein the gaseous stream is selected from the group consisting of fuel gas, flue gas and synthesis gas.

14. The process of claim 1 wherein the processing conditions include a temperature of from about 250° to about 550° C.

15. The process of claim 1 wherein at least 10% of the carbon monoxide is converted to carbon dioxide.

16. The process of claim 1 wherein the water gas shift catalyst converts the carbon monoxide to carbon dioxide to at least 80% of thermodynamic equilibrium conversion value for the water gas shift reaction.

17. The process of claim 1 wherein at least 50% of the $H_2S$ and COS are removed.

18. The process of claim 1 wherein the processing conditions include a pressure of from about 10 to about 80 bar.

19. Separated beds comprising a bed of a sulfur sorbent within a reactor vessel adjacent to a bed of a high temperature water gas shift catalyst within the reactor vessel wherein the sulfur sorbent comprising a nickel aluminate catalyst selected from the group consisting of $Ni_{2x}Al_2O_{2x+3}$, $Ni_{(2-y)}Ni^0_yAl_2O_{(5-y)}$, $Ni_{(4-y)}Ni^0_yAl_2O_{(7-y)}$, $Ni_{(6-y)}Ni^0_yAl_2O_{(9-y)}$, and intermediates thereof, wherein $x>0.5$ and $0.01<y<2$ that is selected to remove $H_2S$ and COS from a gaseous stream that is introduced to the reactor vessel and the high temperature water gas shift catalyst, comprising a sulfur-tolerant catalyst having an active phase comprising an iron oxide phase, is selected to be effective for a water gas shift reaction of carbon monoxide contained in the gaseous stream.

20. The separated beds of claim 19 wherein the water gas shift catalyst is effective under a sulfur compound containing gas stream.

21. The separated beds of claim 19 wherein the water gas shift catalyst comprises an active phase comprising one or more metal oxides.

22. The separated beds of claim 19 wherein the water gas shift catalyst contains iron.

23. The separated beds of claim 19 wherein at least 10% of the carbon monoxide present is converted to carbon dioxide.

24. The separated beds of claim 19 wherein said water gas shift catalyst converts the carbon monoxide to carbon dioxide to at least 80% of thermodynamic equilibrium conversion value for the water gas shift reaction.

25. The separated beds of claim 19 wherein at least 50% of the $H_2S$ and COS is removed.

* * * * *